(12) United States Patent
Chiang et al.

(10) Patent No.: US 10,564,398 B2
(45) Date of Patent: Feb. 18, 2020

(54) LENS AND MANUFACTURING METHOD THEREOF

(71) Applicant: Rays Optics Inc., Hsinchu County (TW)

(72) Inventors: Bing-Ju Chiang, Hsinchu County (TW); Hsin-Te Chen, Hsinchu County (TW); Kuo-Chuan Wang, Hsinchu County (TW); Sheng-Da Jiang, Hsinchu County (TW)

(73) Assignee: Rays Optics Inc., Hsinchu County (TW)

(*) Notice: Subject to any disclaimer, the term of this patent is extended or adjusted under 35 U.S.C. 154(b) by 0 days.

(21) Appl. No.: 15/854,810

(22) Filed: Dec. 27, 2017

(65) Prior Publication Data

US 2019/0196150 A1 Jun. 27, 2019

(51) Int. Cl.
| | |
|---|---|
| *G02B 13/18* | (2006.01) |
| *G02B 13/04* | (2006.01) |
| *G02B 9/04* | (2006.01) |
| *G02B 13/00* | (2006.01) |
| *G02B 9/62* | (2006.01) |
| *G02B 13/14* | (2006.01) |
| *G08B 13/196* | (2006.01) |
| *G02B 9/60* | (2006.01) |

(52) U.S. Cl.
CPC ........... *G02B 13/0045* (2013.01); *G02B 9/60* (2013.01); *G02B 9/62* (2013.01); *G02B 13/04* (2013.01); *G02B 13/146* (2013.01); *G08B 13/19628* (2013.01)

(58) Field of Classification Search
CPC ....... G02B 13/04; G02B 13/0045; G02B 9/62
USPC .......................... 359/713, 752, 756, 761, 762
See application file for complete search history.

(56) References Cited

U.S. PATENT DOCUMENTS

| | | | |
|---|---|---|---|
| 7,471,465 B2 | 12/2008 | Yamashita et al. | |
| 7,684,127 B2 | 3/2010 | Asami | |
| 7,933,078 B2 | 4/2011 | Jung et al. | |
| 8,670,192 B2 | 3/2014 | Asami | |
| 9,036,277 B2 | 5/2015 | Kubota et al. | |
| 9,261,670 B2 | 2/2016 | Lai et al. | |
| 9,261,674 B2 | 2/2016 | Mori et al. | |
| 9,529,178 B2 | 12/2016 | Kubota et al. | |
| 2004/0021958 A1* | 2/2004 | Mizuguchi | G02B 13/06 359/793 |
| 2009/0009888 A1 | 1/2009 | Asami | |
| 2015/0277088 A1* | 10/2015 | Chang | G02B 13/04 359/752 |
| 2015/0346458 A1 | 12/2015 | Asami | |
| 2016/0187619 A1* | 6/2016 | Tang | G02B 13/0045 359/713 |
| 2017/0059816 A1 | 3/2017 | Mori | |
| 2017/0153415 A1* | 6/2017 | Lai | G02B 9/60 |
| 2017/0153416 A1 | 6/2017 | Hsieh et al. | |

(Continued)

*Primary Examiner* — William Choi
(74) *Attorney, Agent, or Firm* — JCIPRNET

(57) ABSTRACT

A lens including a first lens group and a second lens group is provided. The first lens group is disposed between a magnified side and a minified side. The second lens group is disposed between the first lens group and the minified side. The lens includes six or less lens elements, and at least four of the six or less lens elements are aspheric lenses. A field of view of the lens is in a range between 100 degrees and 165 degrees, and the second lens group has at least one spherical lens.

18 Claims, 9 Drawing Sheets

(56) References Cited

U.S. PATENT DOCUMENTS

| | | |
|---|---|---|
| 2017/0184812 A1 | 6/2017 | Yoon et al. |
| 2017/0184815 A1* | 6/2017 | Wang ..................... G02B 5/005 |
| 2017/0293107 A1 | 10/2017 | Wang et al. |
| 2018/0045925 A1* | 2/2018 | Chuang .............. G02B 13/0045 |
| 2018/0164555 A1* | 6/2018 | Su ........................ G02B 15/161 |
| 2018/0341085 A1* | 11/2018 | Bone ........................ G02B 9/62 |

* cited by examiner

LENS AND MANUFACTURING METHOD THEREOF

BACKGROUND OF THE INVENTION

1. Field of the Invention

The invention relates to an optical component and a manufacturing method of the optical component, and particularly relates to a lens and a manufacturing method of the lens.

2. Description of Related Art

Along with the progress of modern video technology, image apparatuses such as digital video cameras (DVCs) and digital cameras (DCs) are broadly used in various fields. One of the core components in the image apparatuses is a lens. A lens is configured to clearly form an image on a display or a charge coupled device (CCD). Besides, due to the prosperous development of smart home surveillance cameras, the demands for a thinner design and more desirable optical properties are also increasing. To satisfy such demands, a lens substantially needs to exhibit characteristics such as a wide field of view, a small size, a thinner design, a high resolution, a large aperture, a low distortion, and day-and-night co-focal, etc.

However, in known lenses, a filter in an apparatus need to be switched, or more lens elements in the lens are required in order to achieve day-and-night co-focal. The manufacturing cost is higher no matter which of the solutions is adopted. Besides, in known lenses, it is common to adopt a plurality of plastic lens elements to reduce the cost. However, a thermal drift phenomenon is more salient if a plurality of plastic lens elements is adopted, and the optical quality is thus affected. Hence, how to manufacture a lens having the aforementioned characteristics and capable of offering a desirable optical quality is now an issue for researchers of the field to work on.

SUMMARY OF THE INVENTION

One or some exemplary embodiments of the invention provide a lens capable of being co-focal in day and night and having a desirable thermal drift performance and a manufacturing method of the lens.

An aspect of the invention provides a lens including a first lens group and a second lens group. The first lens group is disposed between a magnified side and a minified side. The second lens group is disposed between the first lens group and the minified side. The lens includes six or less lens elements, and at least four of the six or less lens elements are aspheric lenses. A field of view of the lens is in a range between 100 degrees and 165 degrees, and the second lens group has at least one spherical lens.

Another aspect of the invention provides a lens including a first lens group and a second lens group. The first lens group is disposed between a magnified side and a minified side. The second lens group is disposed between the first lens group and the minified side. The lens includes six or less lens elements, and at least four of the six or less lens elements are aspheric lenses. A field of view of the lens is in a range between 100 degrees and 165 degrees, and the second lens group has a lens element whose Abbe number is greater than 70.

Based on the above, in the embodiments of the invention, the design of the lens meets predetermined conditions and standards. Therefore, the lens according to the embodiments of the invention has a wide field of view, a miniaturized size, and a low thermal drift, and is able to be co-focal in day and night. Moreover, the lens according to the embodiments of the invention provides a desirable optical imaging quality.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
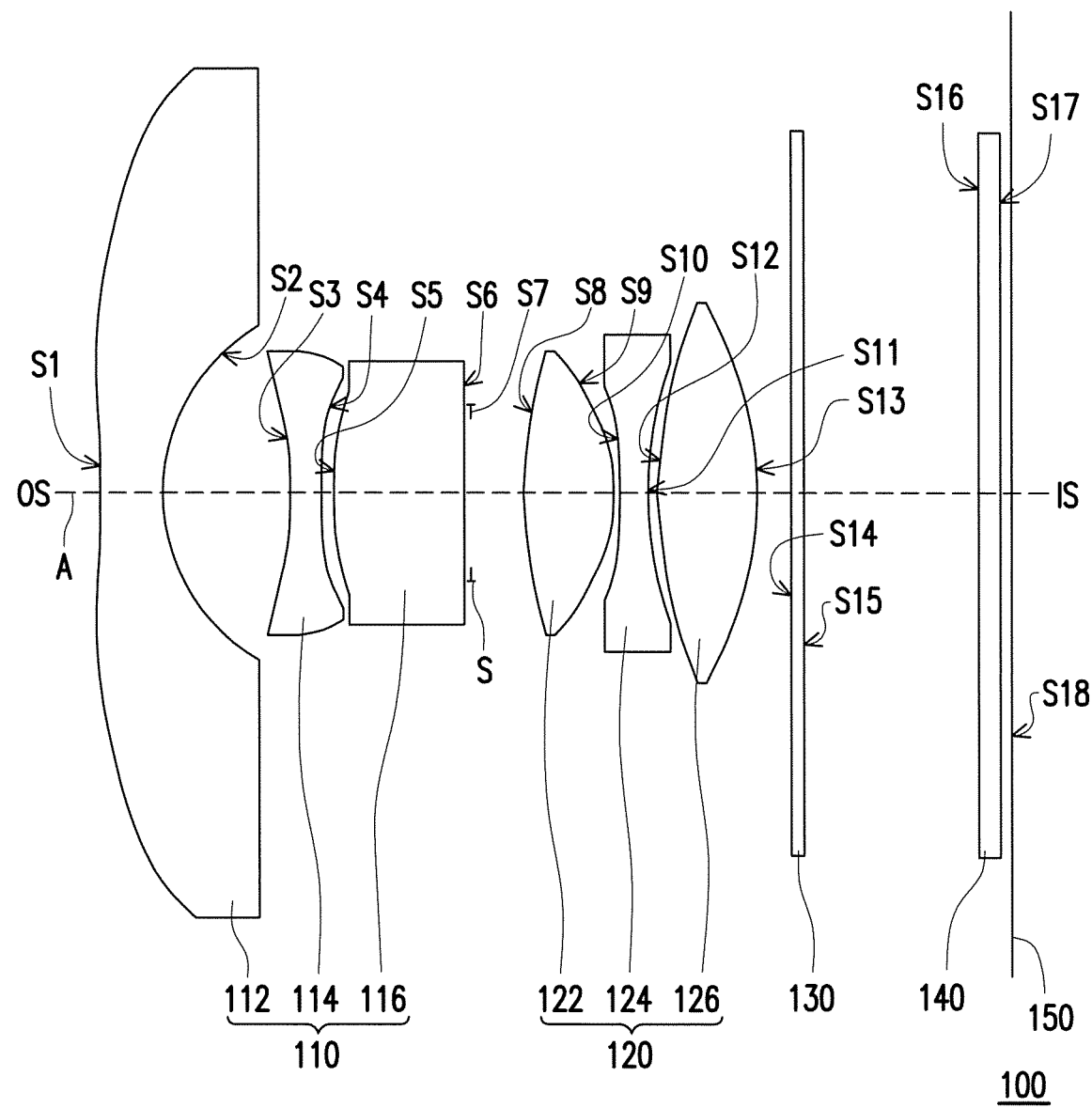
FIG. 1 is a schematic view illustrating a lens according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view illustrating a lens according to an embodiment of the invention. Referring to FIG. 1, a lens 100 of the embodiment includes a first lens group 110 and a second lens group 120. The first lens group 110 is located between a magnified side OS and a minified side IS. The second lens group 120 is disposed between the first lens group 110 and the minified side IS. The first lens group 110 and the second lens group 120 are arranged along an optical axis A of the lens 100.

The lens 100 includes six or less lens elements. At least four of the six or less lens elements are aspheric lenses. In the embodiment, the lens 100 includes six lens elements, and five of the lens elements are aspheric lenses. Accordingly, phenomena such as spherical aberration, coma aberration, astigmatism, curvature of field, and distortion are suppressed, and a high resolution is achieved. In the embodiment, the first lens group 110 has a negative refractive power, and the second lens group 110 has a positive refractive power. Besides, in the embodiment, the lens 100 includes at least four plastic lens elements, but does not include a cemented lens, and the second lens group 120 has at least one spherical lens.

In the embodiment, the first lens group 110 includes a first lens element 112, a second lens element 114, and a third lens 116 sequentially arranged from the magnified side OS toward the minified side IS, and the second lens group 120 includes a fourth lens element 122, a fifth lens element 124, and a sixth lens element 126 sequentially arranged from the magnified side OS toward the minified side IS. In addition, the first lens element 112, the second lens element 114, the third lens element 116, the fourth lens element 122, and the fifth lens element 124 are aspheric lenses. In the embodiment, refractive powers of the first lens element 112 to the sixth lens element 126 are sequentially and respectively negative, negative positive, positive, negative, and positive.

In the embodiment, the first lens element 112 is a biconcave lens, the second lens element 114 is a negative meniscus lens having a concave surface facing toward the magnified side OS, the third lens element 116 is a positive meniscus lens having a convex surface toward the magnified side OS, the fourth lens element 122 is a biconvex lens, the fifth lens element 124 is a biconcave lens, and the sixth lens element is a biconvex lens.

Moreover, in the embodiment, the lens 100 further includes an aperture stop S, a filter device 130, and a glass cover 140. The aperture stop S is disposed between the third lens element 116 of the first lens group 110 and the fourth lens element 122 of the second lens group 120. The filter device 130 is disposed between the sixth lens element 126 of the second lens group 120 and the minified side IS. The glass cover 140 is disposed between the filter device 130 and an imaging surface 150 of the minified side IS.

In the embodiment, the lens 100 meets a condition of 100°≤FOV≤165°, wherein FOV represents a field of view of the lens 100, such as a field of view in a diagonal direction of the imaging surface 150. Accordingly, an optical imaging quality of the lens 100 meeting the aforementioned conditions is ensured, and the lens 100 exhibits desirable optical properties.

Table 1 below lists data in connection with the respective lens elements in the lens 100 shown in FIG. 1.

TABLE 1

| Surface Number | Radius of curvature (millimeter/mm) | Interval (millimeter/mm) | Refractive index | Abbe Number | Label |
|---|---|---|---|---|---|
| S1 | −20.4 | 1.1 | 1.53 | 55.4 | 112 |
| S2 | 2.8 | 2.2 | | | |
| S3 | −3.0 | 0.5 | 1.53 | 55.4 | 114 |
| S4 | −48.6 | 0.2 | | | |
| S5 | 5.7 | 2.3 | 1.66 | 20.4 | 116 |
| S6 | 86.4 | 0.2 | | | |
| S7 | infinity | 0.9 | | | S |
| S8 | 5.2 | 1.6 | 1.53 | 55.4 | 122 |
| S9 | −2.4 | 0.1 | | | |
| S10 | −4.5 | 0.5 | 1.66 | 20.4 | 124 |
| S11 | 10.0 | 0.2 | | | |
| S12 | 7.1 | 1.7 | 1.70 | 55.5 | 126 |
| S13 | −5.6 | 0.6 | | | |
| S14 | infinity | 0.2 | 1.52 | 64.1 | 130 |
| S15 | infinity | 3.2 | | | |
| S16 | infinity | 0.4 | 1.52 | 64.1 | 140 |
| S17 | infinity | 0.1 | | | |
| S18 | infinity | 0.0 | | | 150 |

In Table 1, an interval is defined as a linear distance between two adjacent surfaces along the optical axis A of the lens 100. For example, an interval of the surface S1 is a linear distance between the surface S1 and the surface S2 along the optical axis A. Thicknesses, refractive indices, and Abbe numbers corresponding to the respective lens elements in the "Label" column may be referred to corresponding intervals, refractive indices and Abbe numbers in the same row. Besides, in Table 1, the surface S1 and the surface S2 are two surfaces of the first lens element 112. The surface S3 and the surface S4 are two surfaces of the second lens element 114. Relations among other surfaces and lens elements may be inferred based on the same principle. The surface S7 is the aperture stop S. The surface S14 and the surface S15 are two surfaces of the filter device 130. The surface S16 and the surface S17 are two surfaces of the glass cover 140. The surface S18 is the imaging surface 150.

In the embodiment, the surfaces S1, S2, S3, S4, S5, S6, S8, S9, S10, and S11 of the lens 100 are aspheric surfaces, and can be represented through Formula (1) in the following:

$$Z = \frac{cr^2}{1 + \sqrt{1-(1+K)c^2r^2}} + A_2r^2 + A_4r^4 + A_6r^6 + A_8r^8 + A_{10}r^{10} + A_{12}r^{12} + A_{14}r^{14} + A_{16}r^{16} + \cdots \quad (1)$$

In Formula (1), Z represents a sag in the direction of the optical axis A, and c represents a reciprocal of a radius of an osculating sphere, which is a reciprocal of a radius of curvature near the optical axis A (e.g., radii of curvature of the surfaces S1, S2, S3, S4, S5, S6, S8, S9, S10, and S11 in Table 1.). K represents a conic coefficient, r represents an aspheric height, and $A_2$ to $A_{16}$ are aspheric coefficients. In the embodiment, the coefficients K and $A_2$ are both 0. Table 2 in the following lists aspheric parameter values of the surfaces S1, S2, S3, S4, S5, S6, S8, S9, S10, and S11.

TABLE 2

| | $A_4$ | $A_6$ | $A_8$ | $A_{10}$ | $A_{12}$ |
|---|---|---|---|---|---|
| S1 | 4.2E−03 | −1.8E−04 | 4.9E−06 | −7.4E−08 | 5.0E−10 |
| S2 | −2.4E−03 | −4.6E−05 | 2.0E−04 | −2.9E−05 | −1.2E−06 |
| S3 | 4.3E−02 | −8.3E−03 | 1.3E−03 | −1.1E−04 | 4.7E−06 |
| S4 | 6.6E−02 | −1.8E−02 | 5.0E−03 | −2.8E−05 | −1.8E−04 |
| S5 | 1.4E−02 | −1.2E−02 | 6.3E−03 | −1.2E−03 | 7.0E−06 |
| S6 | −2.3E−04 | 2.1E−03 | 0.0E+00 | 0.0E+00 | 0.0E+00 |
| S8 | −6.6E−03 | 2.0E−04 | 0.0E+00 | 0.0E+00 | 0.0E+00 |
| S9 | 9.4E−03 | 3.0E−03 | −1.1E−03 | 1.9E−04 | 0.0E+00 |
| S10 | 1.1E−02 | 1.2E−03 | −1.2E−03 | 1.6E−04 | 0.0E+00 |
| S11 | 1.3E−02 | −1.2E−03 | −1.2E−04 | 2.4E−05 | −3.2E−07 |

In the lens 100 of the embodiment, the total track length (TTL, i.e. a distance from S1 to S18 on the optical axis) is 15.9 millimeters, the effective focal length (EFL) is 2.00 millimeters, the F-number is 2.0, and the field of view (FOV) is 140 degrees.

Figure 2:
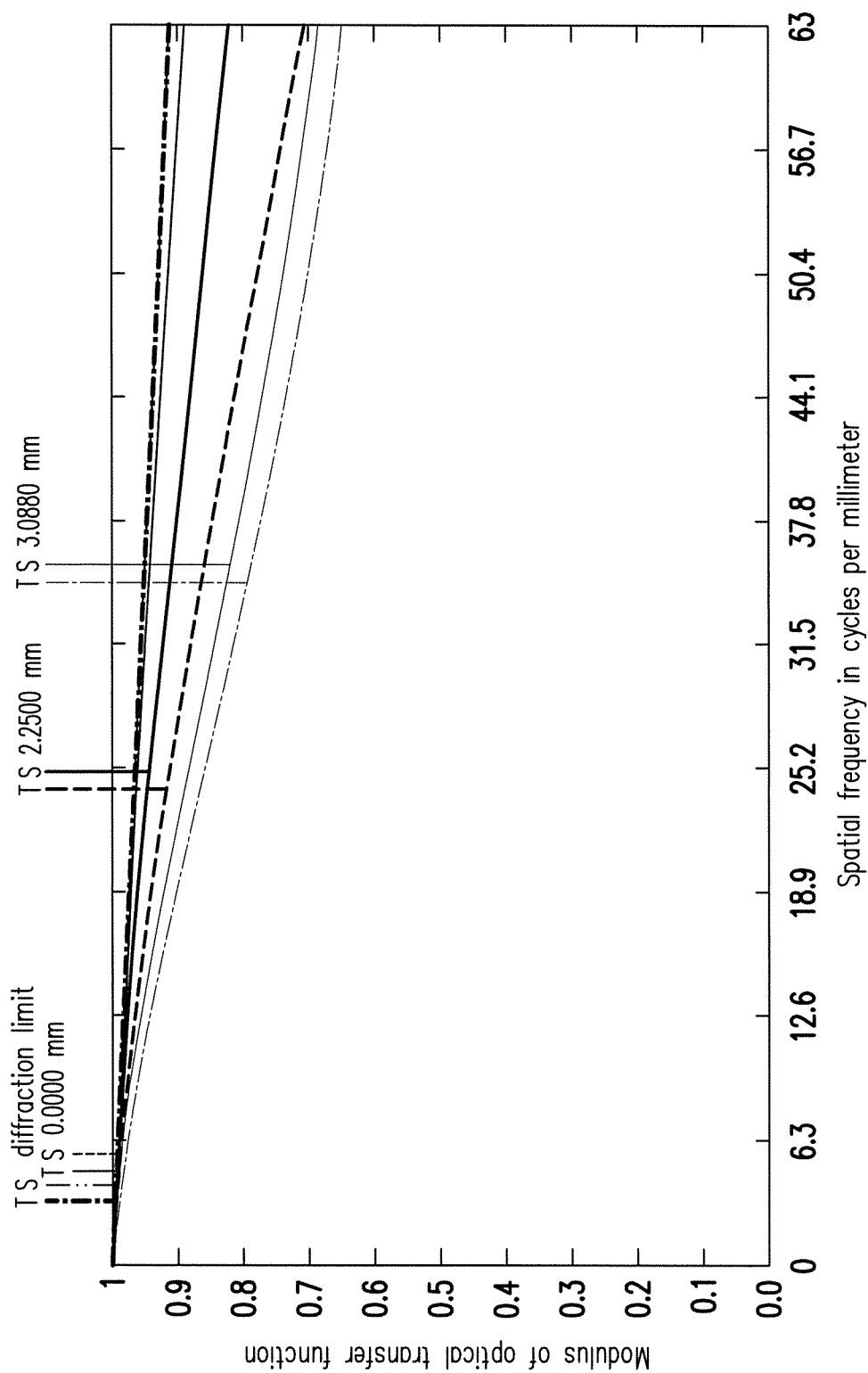
FIGS. 2 to 6 are diagrams illustrating imaging optical simulation data of the lens of FIG. 1.

FIGS. 2 to 6 are diagrams illustrating imaging optical simulation data of the lens of FIG. 1. Referring to FIGS. 2 to 6, FIG. 2 is graph illustrating a modulation transfer function (MTF) of the lens 100 during daytime, the horizontal axis represents a spatial frequency in cycles per millimeter, and the vertical axis represents a modulus of the optical transfer function. In the embodiment, a curve of the modulation transfer function of the lens 100 during daytime is within a standard range, as shown in FIG. 2.

Figure 3:
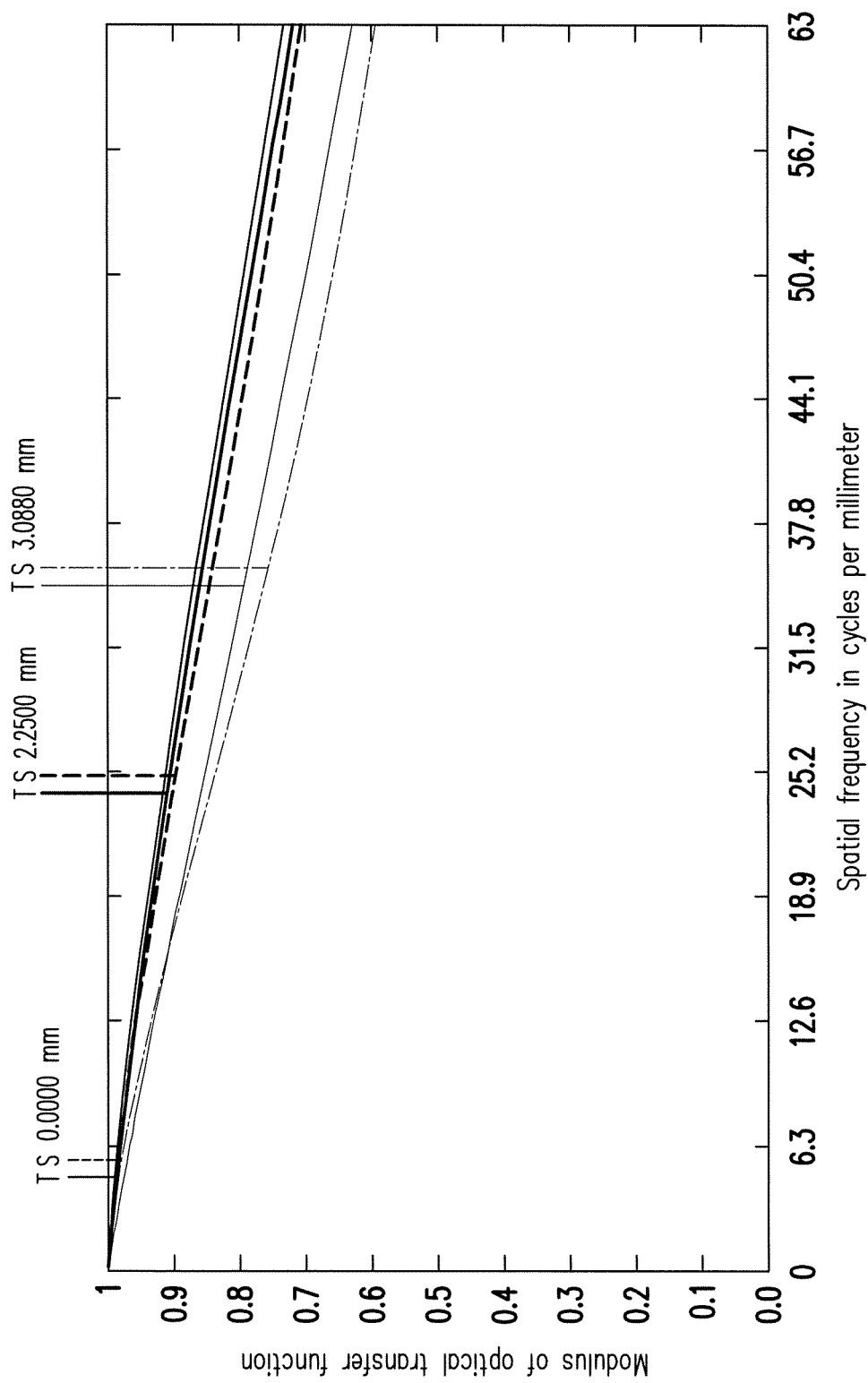

FIG. 3 is a graph illustrating an MTF of the lens 100 within an image height of 3.088 millimeters during nighttime, the horizontal axis represents a spatial frequency, and the vertical axis represents a modulus of the optical transfer function. In the embodiment, a curve of the modulation transfer function of the lens 100 during nighttime is within a standard range, as shown in FIG. 3. It is thus shown that, in the embodiment, the lens 100 uses fewer lens elements and does not require an additional action of switching an infrared filter or require a glass cemented optical device, and is still able to be co-focal in day and night and achieves a desirable optical imaging quality during daytime and nighttime.

Figure 4:
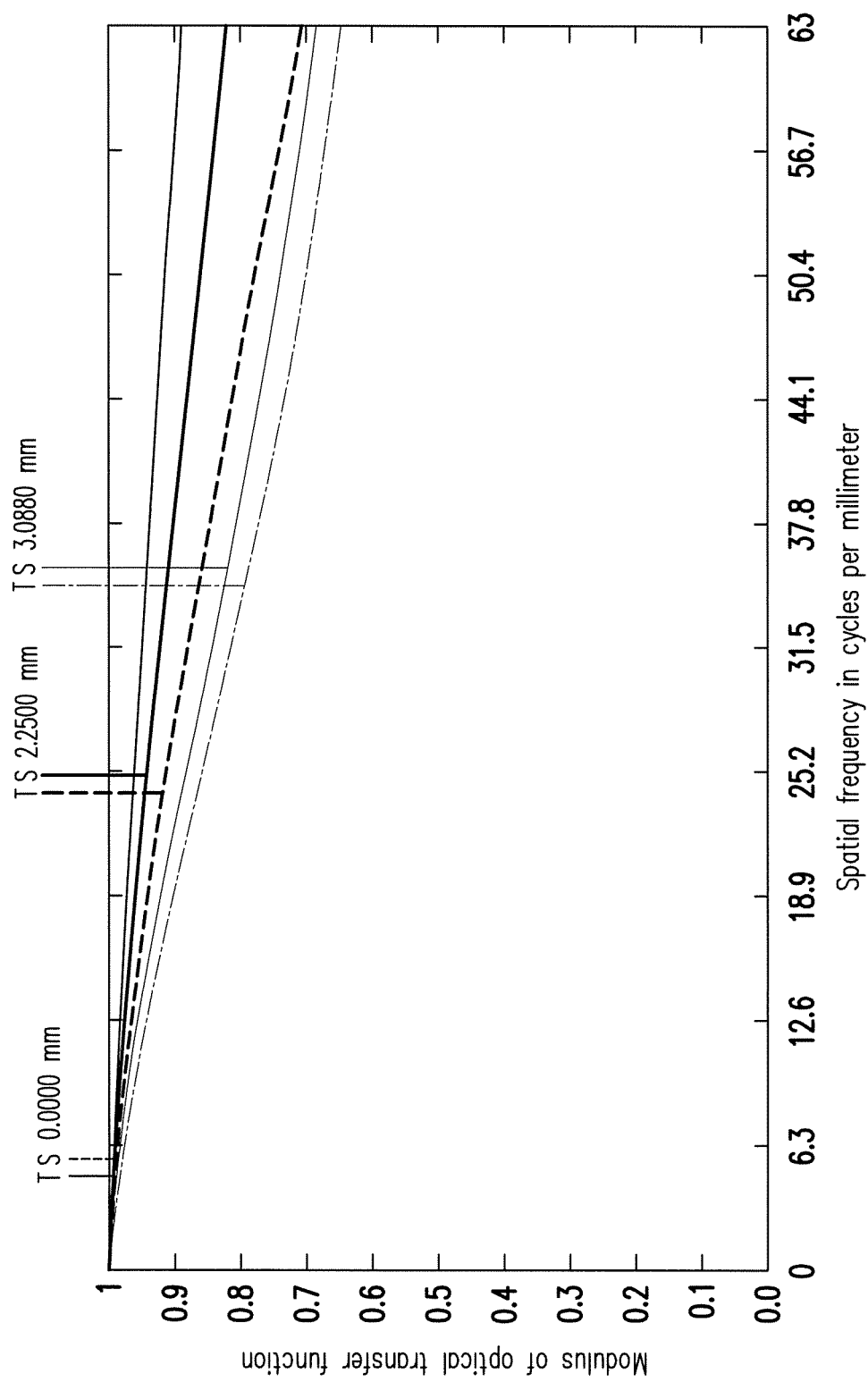
Figure 5:
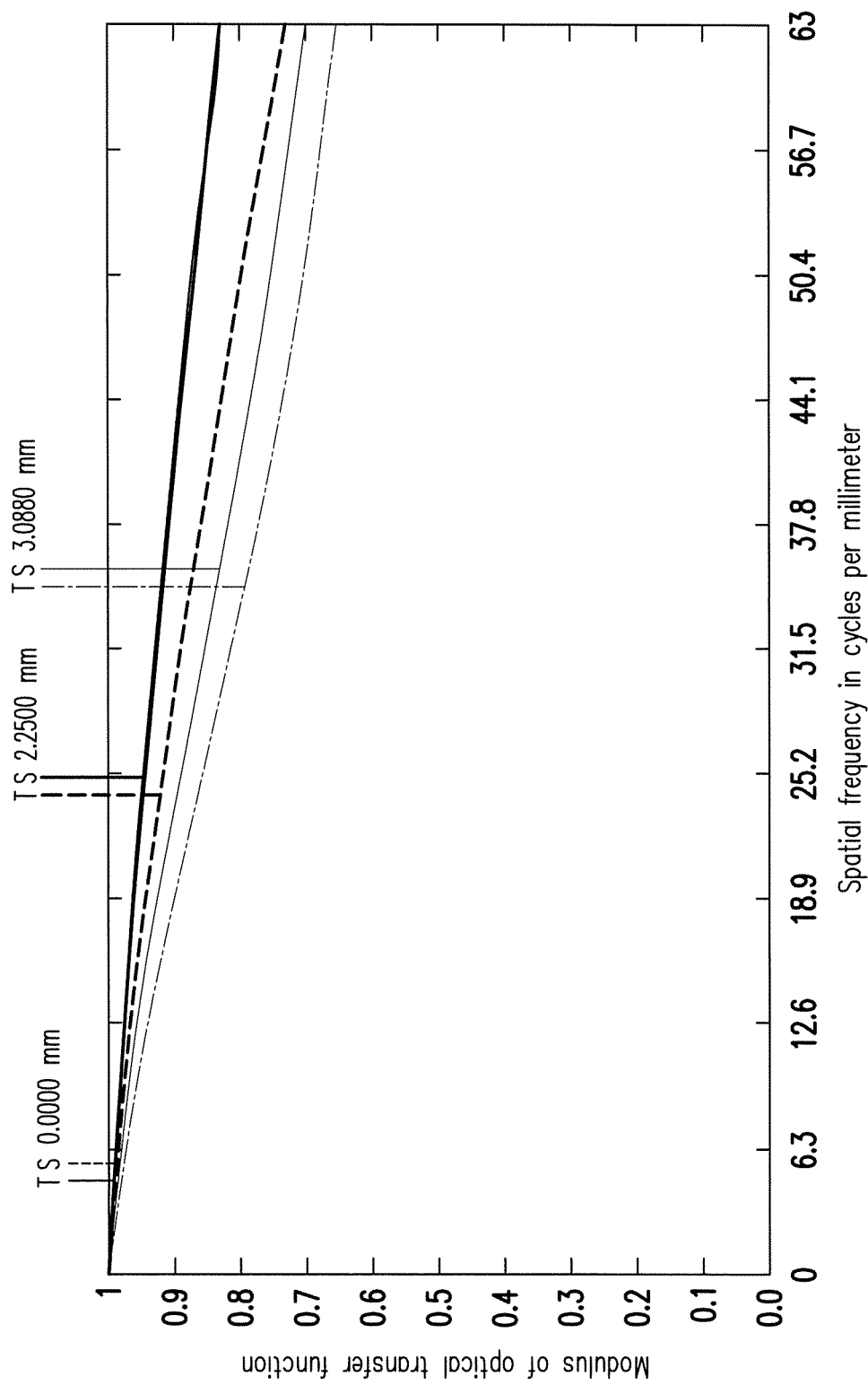
Figure 6:
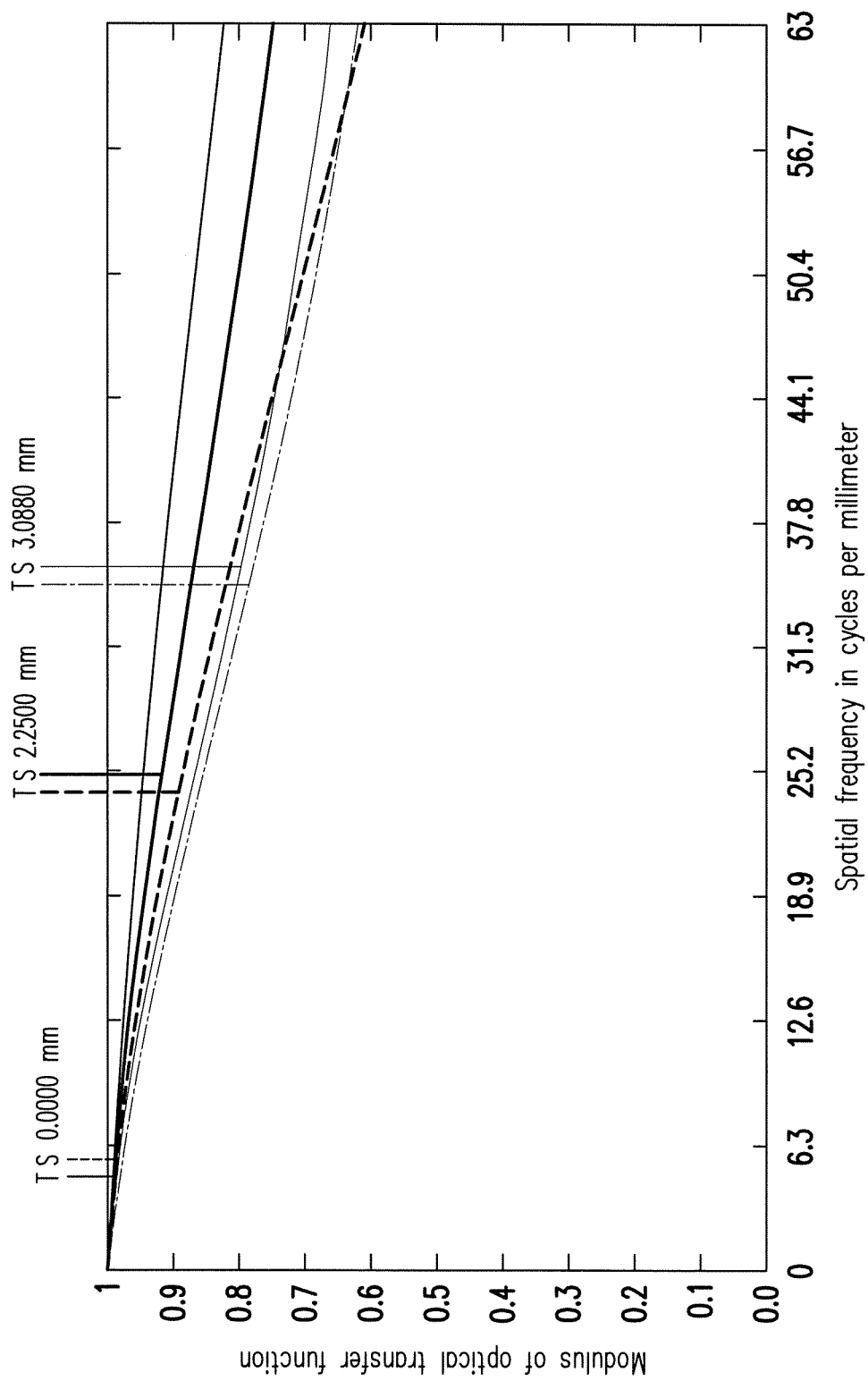

FIGS. 4, 5, and 6 are graphs illustrating MTFs of the lens 100 with respect to different image heights when the temperatures are 20° C., −20° C., and 80° C., respectively. The horizontal axis represents a spatial frequency, the vertical axis represents a modulus of the optical transfer function, T represents a curve in the tangential direction, S represents a curve in the sagittal direction, and values following "TS" represent image heights. In addition, the curve in the tangential direction and the curve in the sagittal direction coincide when the image height is 0.0000 mm. In the embodiment, the modulus of the optical transfer function of the lens 100 is greater than 60% when the temperature is 20° C., the spatial frequency is 63 lp/mm, and the image height is within 3.088 mm, the modulus of the optical transfer function of the lens 100 is greater than 60% when the temperature is −20° C., the spatial frequency is 63 lp/mm, and the image height is within 3.088 mm, and the modulus of the optical transfer function of the lens 100 is greater than 60% when the temperature is 80° C., the spatial frequency is 63 lp/mm, and the image height is within 3.088 mm, as shown in FIGS. 4 to 6. The optical performance is desirable when the spatial frequency is 63 lp/mm and the temperature ranges from −20° C. to 80° C. In other words, the lens 100 of the embodiment exhibits a low thermal drift and a desirable optical imaging quality within the temperature range from −20° C. to 80° C.

Figure 7:
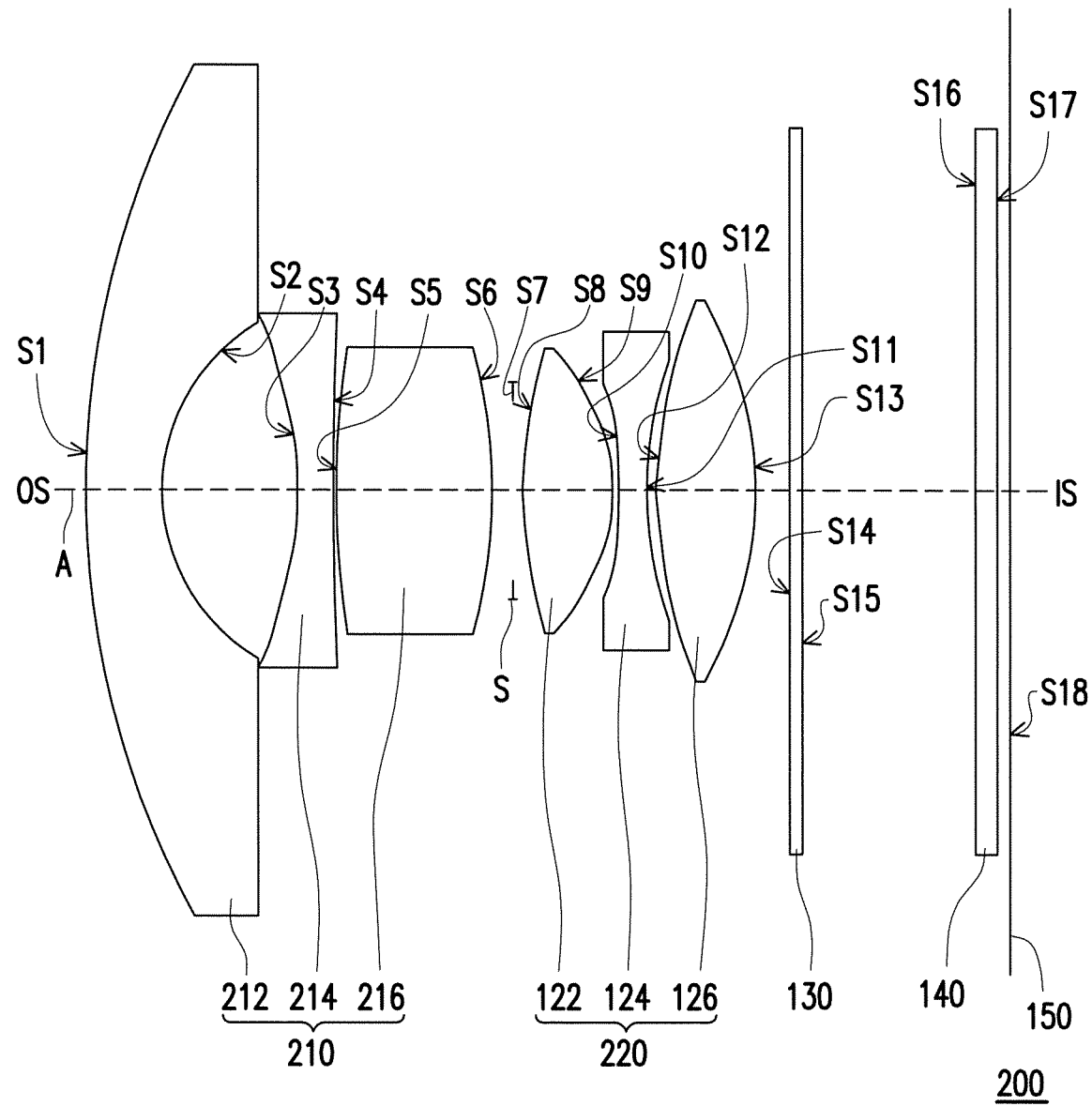
FIG. 7 is a schematic view illustrating a lens according to another embodiment of the invention.

FIG. 7 is a schematic view illustrating a lens according to another embodiment of the invention. Referring to FIG. 7, a lens 200 of the embodiment is similar to the lens 100 of FIG. 1, but the two lenses differ in that a second lens group 220 of the lens 200 of the embodiment includes a lens element whose Abbe number is greater than 70. Specifically, the lens element (i.e., the fourth lens element 122) of the second lens group 220 closest to a first lens group 210 has an Abbe number greater than 70. Accordingly, the chromatic aberration between light at the wavelength of visible light and light at the infrared light is reduced and the lens 200 may exhibit a desirable optical property. In addition, the lens 200 has simultaneously and substantially the same focal position for the visible light and the infrared light.

Specifically, what differs from the lens 100 of FIG. 1 is that, in the embodiment, a first lens element 212 is a negative meniscus lens having a convex surface facing toward the magnified side OS, a second lens element 214 is a biconcave lens, and a third lens element 216 is a biconvex lens. In addition, the first lens element 212, the second lens element 214, the third lens element 216, the fifth lens element 124, and the sixth lens element 126 are aspheric lenses.

Table 3 below lists data in connection with the respective lens elements in the lens 200 shown in FIG. 7.

TABLE 3

| Surface Number | Radius of curvature (millimeter/mm) | Interval (millimeter/mm) | Refractive index | Abbe Number | Label |
|---|---|---|---|---|---|
| S1 | 8.2 | 1.3 | 1.54 | 56.1 | 212 |
| S2 | 1.4 | 2.7 | | | |
| S3 | −4.6 | 0.5 | 1.54 | 56.1 | 214 |
| S4 | 55.7 | 0.1 | | | |
| S5 | 8.3 | 2.4 | 1.66 | 20.4 | 216 |
| S6 | −6.0 | 0.3 | | | |
| S7 | infinity | 0.3 | | | S |
| S8 | 6.6 | 1.3 | 1.44 | 95.1 | 122 |
| S9 | −2.8 | 0.1 | | | |
| S10 | −9.3 | 0.5 | 1.66 | 20.4 | 124 |
| S11 | 3.3 | 0.2 | | | |
| S12 | 3.6 | 2.2 | 1.54 | 56.1 | 126 |
| S13 | −3.2 | 0.9 | | | |
| S14 | infinity | 0.2 | 1.52 | 64.1 | 130 |
| S15 | infinity | 2.7 | | | |
| S16 | infinity | 0.4 | 1.52 | 64.1 | 140 |
| S17 | infinity | 0.1 | | | |
| S18 | infinity | 0.0 | | | 150 |

Definitions of the surfaces S1 to S18 in the "Label" column, the intervals, refractive indices, and Abbe numbers, and the corresponding relationships of intervals, refractive indices, and Abbe numbers of the same rows in Table 3 are arranged in a way similar to the arrangement of Table 1. Therefore, details in this respect will not be repeated in the following.

In the embodiment, the surfaces S1, S2, S3, S4, S5, S6, S10, S11, S12, and S13 of the lens 200 are aspheric surfaces, and can be represented through Formula (1) above. In addition, in the embodiment, the coefficients $A_2$ and $A_{12}$ are 0. Table 4 in the following lists aspheric parameter values of the surfaces S1, S2, S3, S4, S5, S6, S10, S11, S12, and S13.

TABLE 4

| | K | $A_4$ | $A_6$ | $A_8$ | $A_{10}$ |
|---|---|---|---|---|---|
| S1 | −3.7E+01 | 1.6E−04 | 4.4E−06 | 5.4E−09 | 0.0E+00 |
| S2 | −9.5E−01 | −2.8E−03 | 2.5E−03 | −2.3E−04 | −1.4E−06 |
| S3 | −1.1E+01 | −2.1E−02 | 5.9E−03 | −6.0E−04 | 2.2E−05 |
| S4 | 0.0E+00 | −1.7E−02 | 1.2E−02 | −2.0E−03 | 2.8E−04 |
| S5 | −8.3E+01 | 0.0E+00 | 0.0E+00 | 0.0E+00 | 0.0E+00 |
| S6 | −1.3E+00 | 0.0E+00 | 0.0E+00 | 0.0E+00 | 0.0E+00 |
| S10 | 1.8E+01 | −1.7E−02 | 3.0E−03 | −5.6E−04 | 0.0E+00 |
| S11 | 1.7E−01 | −3.8E−02 | 1.0E−02 | −1.8E−03 | 1.2E−04 |
| S12 | −3.0E−01 | −2.8E−02 | 5.4E−03 | −6.4E−04 | 3.0E−05 |
| S13 | −7.5E−01 | −5.8E−05 | −5.1E−04 | 3.3E−05 | 0.0E+00 |

In the lens 200 of the embodiment, the total track length TTL is 16.1 millimeters, the effective focal length (EFL) is 1.85 millimeters, the F-number is 2.0, and the FOV is 140 degrees.

Figure 8:
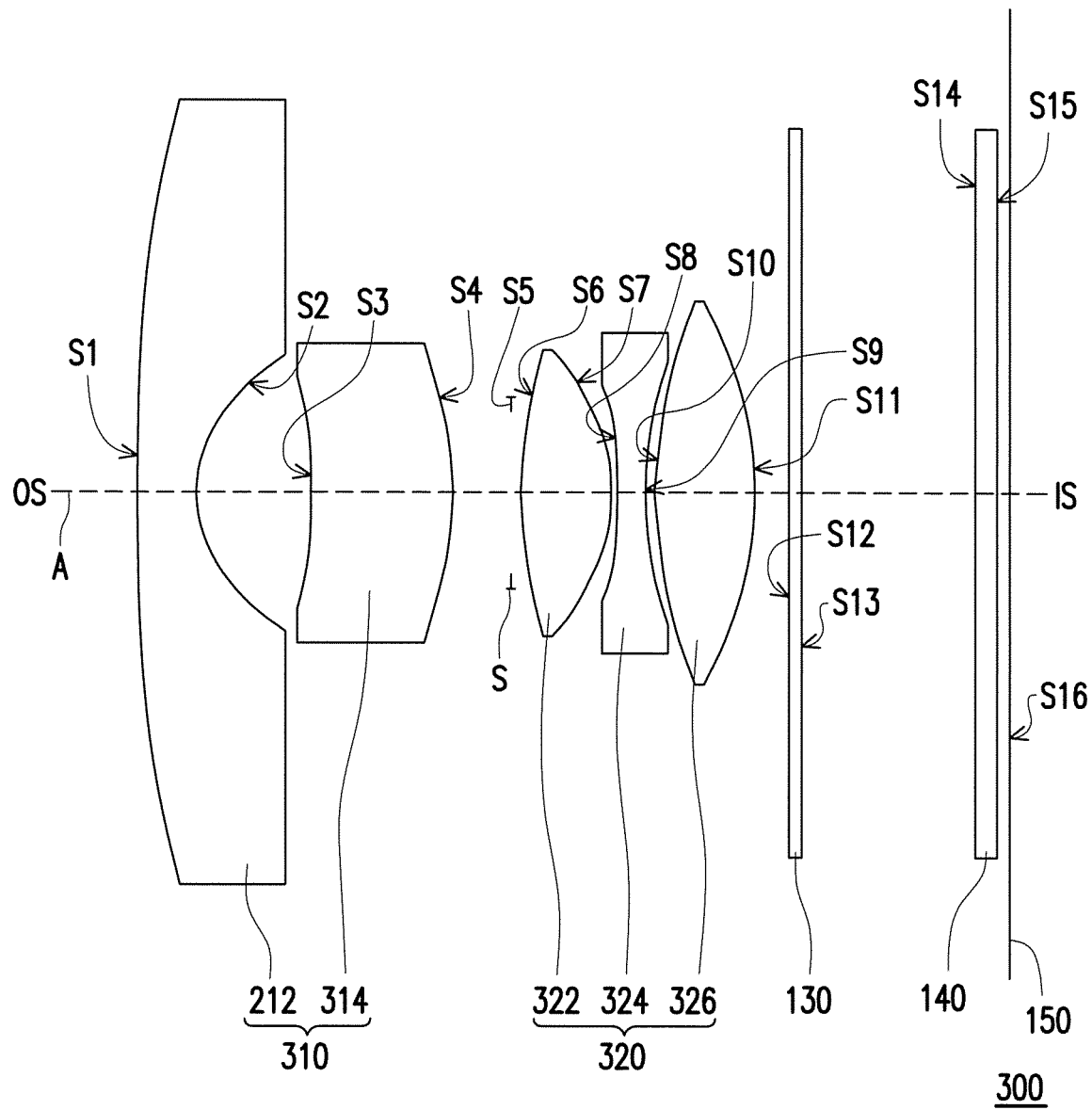
FIG. 8 is a schematic view illustrating a lens according to another embodiment of the invention.

FIG. 8 is a schematic view illustrating a lens according to another embodiment of the invention. Referring to FIG. 8, a lens 300 of the embodiment is similar to the lens 200 of FIG. 7, but the two lenses differ in that the number of lens elements in a first lens group 310 of the lens 300 is two, and the number of lens elements in a second lens group 320 of the lens 300 is three. Specifically, in the embodiment, the lens 300 includes five lens elements.

What differs from the lens 200 of FIG. 2 is that, in the embodiment, the first lens group 310 includes the first lens element 212 and a second lens element 314 sequentially arranged from the magnified side OS toward the minified side IS, and the second lens group 320 includes a third lens element 322, a fourth lens element 324, and a fifth lens element 326 sequentially arranged from the magnified side OS toward the minified side IS.

In the embodiment, the second lens element 314 is a positive meniscus lens having a concave surface facing toward the magnified side OS, the third lens element 322 is a biconvex lens, the fourth lens element 324 is a negative meniscus lens having a convex surface facing toward the magnified side OS, and the fifth lens element 326 is a biconvex lens. In addition, the first lens element 212, the second lens element 314, the fourth lens element 324, and the fifth lens element 326 are aspheric lenses. In the embodiment, refractive powers of the first lens element 212 to the fifth lens element 326 are sequentially and respectively negative, positive, positive, negative, and positive.

Table 5 below lists data in connection with the respective lens elements in the lens 300 shown in FIG. 8.

TABLE 5

| Surface Number | Radius of curvature (millimeter/mm) | Interval (millimeter/mm) | Refractive index | Abbe Number | Label |
|---|---|---|---|---|---|
| S1 | 79.1 | 1.1 | 1.53 | 55.4 | 212 |
| S2 | 1.6 | 2.2 | | | |
| S3 | −10.5 | 2.7 | 1.66 | 20.4 | 314 |
| S4 | −4.6 | 1.2 | | | |

TABLE 5-continued

| Surface Number | Radius of curvature (millimeter/mm) | Interval (millimeter/mm) | Refractive index | Abbe Number | Label |
|---|---|---|---|---|---|
| S5 | infinity | 0.7 | | | S |
| S6 | 5.6 | 1.5 | 1.44 | 95.1 | 322 |
| S7 | −3.3 | 0.1 | | | |
| S8 | 15.0 | 0.5 | 1.66 | 20.4 | 324 |
| S9 | 2.5 | 0.3 | | | |
| S10 | 3.5 | 2.1 | 1.53 | 55.4 | 326 |
| S11 | −4.5 | 0.3 | | | |
| S12 | infinity | 0.2 | 1.52 | 64.1 | 130 |
| S13 | infinity | 2.8 | | | |
| S14 | infinity | 0.4 | 1.52 | 64.1 | 140 |
| S15 | infinity | 0.1 | | | |
| S16 | infinity | 0.0 | | | 150 |

In table 5, the surface S5 is the aperture stop S. Definitions of the surfaces S1 to S16 in the "Label" column, the intervals, refractive indices, and Abbe numbers, and the corresponding relationships of intervals, refractive indices, and Abbe numbers of the same rows in Table 5 are arranged in a way similar to the arrangement of Table 1. Therefore, details in this respect will not be repeated in the following.

In the embodiment, the surfaces S1, S2, S3, S4, S8, S9 S10, and S11 of the lens 300 are aspheric surfaces, and can be represented through Formula (1) above. In addition, in the embodiment, the coefficient $A_2$ is 0. Table 6 in the following lists aspheric parameter values of the surfaces S1, S2, S3, S4, S8, S9, S10, and S11.

TABLE 6

| | K | $A_4$ | $A_6$ |
|---|---|---|---|
| S1 | 4.1E+01 | 4.3E−04 | 2.5E−06 |
| S2 | −2.9E+00 | 6.2E−02 | −1.3E−02 |
| S3 | −5.9E+00 | −1.2E−02 | 1.4E−03 |
| S4 | 1.8E+00 | 7.8E−04 | 1.1E−03 |
| S8 | 0.0E+00 | −3.1E−02 | 4.3E−03 |
| S9 | −1.5E−01 | −4.7E−02 | 8.9E−03 |
| S10 | −1.2E+00 | −1.5E−02 | 2.3E−03 |
| S11 | −6.8E−01 | 5.2E−04 | −3.0E−04 |

| | $A_8$ | $A_{10}$ | $A_{12}$ |
|---|---|---|---|
| S1 | −6.0E−07 | 2.2E−08 | −2.3E−10 |
| S2 | 2.6E−03 | −2.0E−04 | 0.0E+00 |
| S3 | −6.1E−04 | 1.3E−04 | −8.9E−06 |
| S4 | −1.6E−04 | 2.3E−05 | 1.8E−06 |
| S8 | −4.7E−04 | −1.7E−05 | 0.0E+00 |
| S9 | −1.6E−03 | 1.5E−04 | −9.5E−06 |
| S10 | −2.1E−04 | 7.3E−06 | 1.4E−07 |
| S11 | 1.2E−04 | −2.5E−05 | 2.1E−06 |

In the lens 300 of the embodiment, the total track length TTL is 16.1 millimeters, the effective focal length (EFL) is 1.92 millimeters, the F-number is 2.0, and the FOV is 140 degrees. Similar to the lens 100 of FIG. 1, the lenses 200 and 300 also use fewer lens elements and do not require an additional action of switching an infrared filter or require a glass cemented optical device, and still achieve a desirable optical imaging quality during daytime and nighttime. In other words, the lenses 200 and 300 are able to be co-focal in day and night. Besides, the lenses 200 and 300 also exhibit a low thermal drift and a desirable optical imaging quality.

Figure 9:
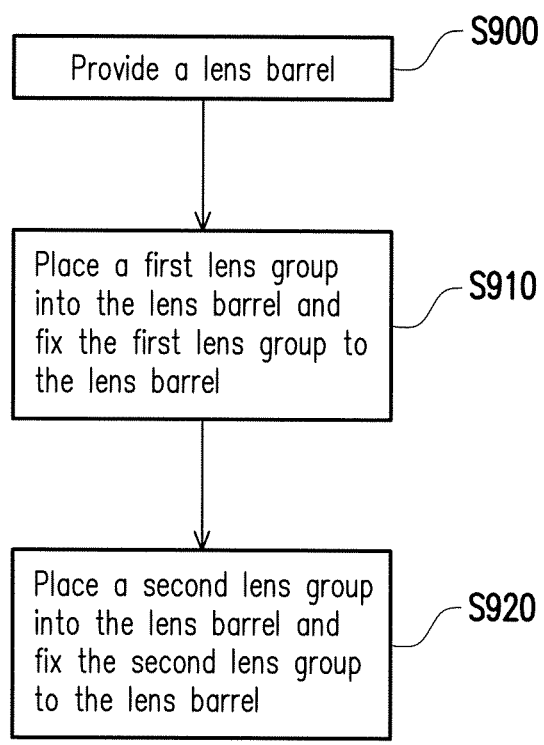
FIG. 9 is a flowchart illustrating a manufacturing method of a lens according to an embodiment of the invention.

FIG. 9 is a flowchart illustrating a manufacturing method of a lens according to an embodiment of the invention. Referring to FIG. 9, in the embodiment, the manufacturing method of the lens is at least applicable for the lens 100 of FIG. 1, the lens 200 of FIG. 7, or the lens 300 of FIG. 8. In the following, the embodiment is described by using the lens 100 of FIG. 1 as an example. However, the invention is not limited thereto. In the manufacturing method of the lens in this embodiment, at Step S900, a lens barrel is provided. At Step S910, the first lens group 110 is placed into the lens barrel and fixed to the lens barrel. At Step S920, the second lens group 120 is placed into the lens barrel and fixed to the lens barrel. Accordingly, manufacture of the lens 100 is completed.

In view of the foregoing, in the exemplary embodiments of the invention, the design of the lens meets predetermined conditions and standards. Therefore, the lens according to the embodiments of the invention has a wide field of view, a miniaturized size, and a low thermal drift, and is able to be co-focal in day and night. Moreover, the lens according to the embodiments of the invention provides a desirable optical imaging quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lens, comprising:
a first lens group, disposed between a magnified side and a minified side; and
a second lens group, disposed between the first lens group and the minified side,
wherein the lens comprises six or less lens elements, at least four of the six or less lens elements are aspheric lenses, a field of view of the lens is within a range between 100 degrees and 165 degrees, and the second lens group has at least one spherical lens,
wherein the first lens group has a negative refractive power, and the second lens group has a positive refractive power,
wherein a total track length of the lens is equal to or smaller than 16.1 mm.

2. The lens as claimed in claim 1, further comprising an aperture stop disposed between the first lens group and the second lens group.

3. The lens as claimed in claim 1, wherein the first lens group comprises a first lens element, a second lens element, and a third lens element sequentially arranged from the magnified side toward the minified side, the second lens group comprises a fourth lens element, a fifth lens element, and a sixth lens element sequentially arranged from the magnified side toward the minified side, and the fourth lens element and the fifth lens element are aspheric lenses.

4. The lens as claimed in claim 3, wherein refractive powers of the first lens element to the sixth lens element are respectively negative, negative, positive, positive, negative, and positive.

5. The lens as claimed in claim 3, wherein the first lens element, the second lens element, and the third lens element are aspheric lenses.

6. The lens as claimed in claim 1, wherein the lens comprises at least four plastic lens elements, and the lens does not comprise a cemented lens.

7. The lens as claimed in claim 1, wherein a lens element of the second lens group closest to the first lens group has an Abbe number greater than 70.

8. A lens, comprising:
a first lens group, disposed between a magnified side and a minified side; and
a second lens group, disposed between the first lens group and the minified side,
wherein the lens comprises six or less lens elements, at least four of the six or less lens elements are aspheric lenses, a field of view of the lens is within a range between 100 degrees and 165 degrees, and the second lens group comprises a lens element whose Abbe number is greater than 70,
wherein the first lens group has a negative refractive power, and the second lens group has a positive refractive power,
wherein a total track length of the lens is equal to or smaller than 16.1 mm.

9. The lens as claimed in claim 8, further comprising an aperture stop disposed between the first lens group and the second lens group.

10. The lens as claimed in claim 8, wherein the first lens group comprises a first lens element, a second lens element, and a third lens element sequentially arranged from the magnified side toward the minified side, the second lens group comprises a fourth lens element, a fifth lens element, and a sixth lens element sequentially arranged from the magnified side toward the minified side, and the fourth lens element and the fifth lens element are aspheric lenses.

11. The lens as claimed in claim 10, wherein refractive powers of the first lens element to the sixth lens element are respectively negative, negative, positive, positive, negative, and positive.

12. The lens as claimed in claim 10, wherein the first lens element, the second lens element, and the third lens element are aspheric lenses.

13. The lens as claimed in claim 8, wherein the lens comprises at least four plastic lens elements, and the lens does not comprise a cemented lens.

14. The lens as claimed in claim 8, wherein a lens element of the second lens group closest to the first lens group has an Abbe number greater than 70.

15. The lens as claimed in claim 8, wherein the number of lens elements in the lens is six, the fourth element counted from the magnified side toward the minified side is a spherical lens, and a lens element closest to the minified side is an aspheric lens.

16. The lens as claimed in claim 8, wherein the number of lens elements of the first lens group is two, and the number of lens elements of the second lens group is three.

17. The lens as claimed in claim 16, wherein the first lens group comprises a first lens element and a second lens element sequentially arranged from the magnified side toward the minified side, the second lens group comprises a third lens element, a fourth lens element, and a fifth lens element sequentially arranged from the magnified side toward the minified side, and the fourth lens element and the fifth lens element are aspheric lenses.

18. The lens as claimed in claim 17, wherein the lens satisfies one of the following conditions: (1) refractive powers of the first lens element to the fifth lens element are respectively negative, positive, positive, negative, and positive, and (2) the first element and the second lens element are aspheric lens elements.

* * * * *